*E. W. Talbott,*
*Line Holder.*
No. 110,802.  Patented Jan. 3, 1871.
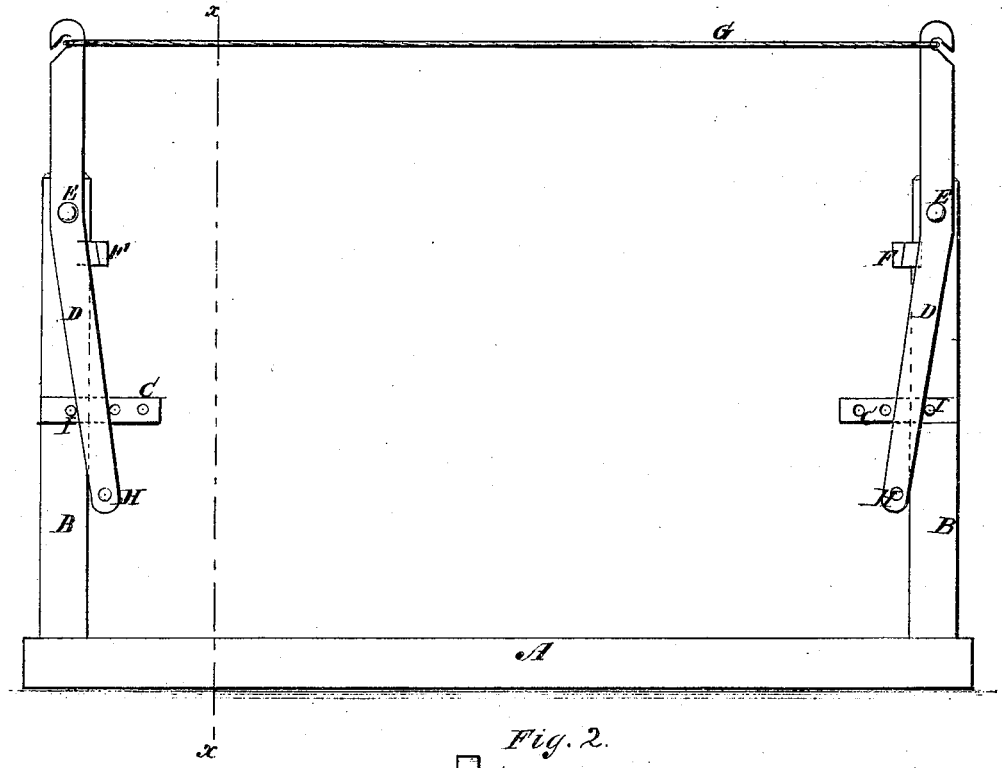
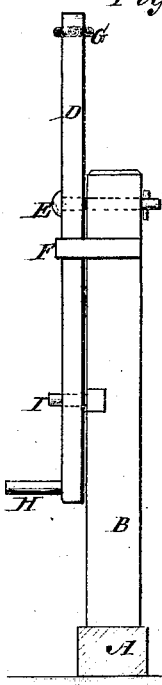
Fig. 2.
Witnesses:
E. Wolff
L. S. Mabee
Inventor:
E. W. Talbott
per Munn & Co.
Attorneys.

UNITED STATES PATENT OFFICE.

EZRA W. TALBOTT, OF NAPOLEON, OHIO, ASSIGNOR TO HIMSELF AND JAMES W. MILLER, OF SAME PLACE.

IMPROVEMENT IN CLOTHES-LINE HOLDERS.

Specification forming part of Letters Patent No. 110,802, dated January 3, 1871.

*To all whom it may concern:*

Be it known that I, EZRA W. TALBOTT, of Napoleon, in the county of Henry and State of Ohio, have invented a new and useful Improvement in Clothes-Line Holder; and I do hereby declare that the following is a full, clear, and exact description thereof, which will enable others skilled in the art to make and use the same, reference being had to the accompanying drawing, forming part of this specification.

This invention relates to a new and useful improvement in mode of raising, stretching, and holding clothes-lines; and consists in a frame provided with levers and stops, constructed, arranged, and operating as hereinafter more fully described.

In the accompanying drawing, Figure 1 represents a side elevation of the invention. Fig. 2 is a vertical section, looking to the left from the line $x$ $x$ of Fig. 1.

Similar letters of reference indicate corresponding parts.

A is a base or sill piece. B B are uprights attached to A or inserted in the ground, with arms C projecting inward, through which is a series of holes, as seen in the drawing. D D are levers, which have their fulcrums at the points E E on the uprights B B. F F are stops on the uprights B B, which limit the motion or back movement of the levers. G represents the clothes-line, which is fastened to the top ends of the levers by means of hooks or slotted holes, or in any suitable manner. H represents pins or handles in the lower ends of the levers, for convenience in straining the line.

When the line has been attached to the levers, as seen in the drawing, the lower ends of the levers are drawn inward toward each other, and fastened in any desired position by the pins I I in one of the series of holes in the arms C C.

Either one of the levers may be fixed or made stationary, and the line may be stretched by the other lever.

The line is attached to the levers before the levers are attached to the uprights by their fulcrum-pins, so that when the levers are put in place the line is elevated a suitable distance above the ground.

This is a simple and effective method of elevating, stretching, and holding clothes-lines, and its advantages will be readily understood by all.

The uprights may, of course, be used in the ground, in which case the ground would be the base.

Having thus described my invention, I claim as new and desire to secure by Letters Patent—

The angle-levers D D, having a hook at the top and detachably fulcrumed at E, combined, as described, with pin I and the uprights B B, having stops F F and perforated arms C C, for the purpose specified.

E. W. TALBOTT.

Witnesses:
  A. T. STOUT,
  J. N. HIGH.